(12) United States Patent
Kuo (10) Patent No.: US 6,341,673 B1
(45) Date of Patent: Jan. 29, 2002

(54) ACTUATOR FOR A HYDRAULIC BRAKE SYSTEM OF BICYCLES

(76) Inventor: Yung-Pin Kuo, No. 55, Alley 121, Lane 175, Kuo Shen Rd, Chang Hwa City (TW)

(*) Notice: Subject to any disclaimer, the term of this patent is extended or adjusted under 35 U.S.C. 154(b) by 0 days.

(21) Appl. No.: 09/610,524

(22) Filed: Jul. 7, 2000

(30) Foreign Application Priority Data

Jul. 4, 2000 (TW) ........................................ 89106666 A (51) Int. Cl.[7] ................................................. B62L 3/00

(52) U.S. Cl. ................................................. 188/24.22

(58) Field of Search ........................... 188/24.21, 24.22, 188/344, 106 F, 72.6, 72.4, 72.5, 73.43, 73.44, 73.2, 73.45, 20, 26, 106 P, 18 A; 60/592, 594; 303/9.64

(56) References Cited

U.S. PATENT DOCUMENTS 2,911,004 A * 11/1959 Whitten .................... 137/512.2
5,632,362 A * 5/1997 Leitner ........................ 188/344

* cited by examiner

Primary Examiner—Christopher P. Schwartz
Assistant Examiner—C. T. Bartz
(74) Attorney, Agent, or Firm—Rosenberg, Klein & Lee (57) ABSTRACT

An actuator for a hydraulic brake system of bicycle includes a box having a chamber and a passage which communicates with the a chamber. Hydraulic oil is filled in the chamber and the passage. A piston is movably inserted into the a chamber and a brake cable is fixedly connected to the piston. The passage is connected with a brake mechanism so that when pulling a brake lever to pull the brake cable, the piston is moved to push the hydraulic oil to the passage to actuate the brake mechanism. A spring is biased between the piston and an inside defining the chamber if the box is connected to the brake lever. The piston will be back to its original position by the spring when releasing the brake lever.

7 Claims, 9 Drawing Sheets

ACTUATOR FOR A HYDRAULIC BRAKE SYSTEM OF BICYCLES

FIELD OF THE INVENTION

The present invention relates to an actuator for a hydraulic brake system of bicycles. The actuator includes at least one chamber filled with oil which is pushed by a piston to actuate brake mechanism.

BACKGROUND OF THE INVENTION

A conventional brake system for bicycles generally includes two calipers each have a brake pad connected thereto and the two brake pads are located on two sides of a wheel rim. Each caliper is connected one end of a brake cable and the other end of the brake cable is connected to a brake lever so that when pulling the brake lever, the brake cable is pulled to pivot the calipers to let the two brake pads move toward the wheel rim to stop the rim. An inherent shortcoming is that the brake cables will be loosened after being used for a period of time. Once the brake cables are loosened, a skilled person is required to adjust the tension of the brake cables. Although hydraulic brake systems are developed and used on some types of bicycles, the cost of the hydraulic brake system is high and occupies a lot space.

The present invention intends to provide an actuator for a hydraulic brake system that has a compact box with a chamber filled with oil. A piston is movably received in the chamber and pushes the oil to operate the brake mechanism when pulling a brake lever.

SUMMARY OF THE INVENTION

In accordance with one aspect of the present invention, there is provided an actuator for a hydraulic brake system of bicycle includes a box having a chamber and a passage which communicates with the a chamber. Hydraulic oil is filled in the chamber and the passage. A piston is movably inserted into the a chamber and a brake cable is fixedly connected to the piston. The passage is connected with a brake mechanism so that when pulling a brake lever to pull the brake cable, the piston is moved to push the hydraulic oil to the passage to actuate the brake mechanism.

The object of the present invention is to provide an actuator that precisely transfers hydraulic oil to actuate the brake mechanism.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
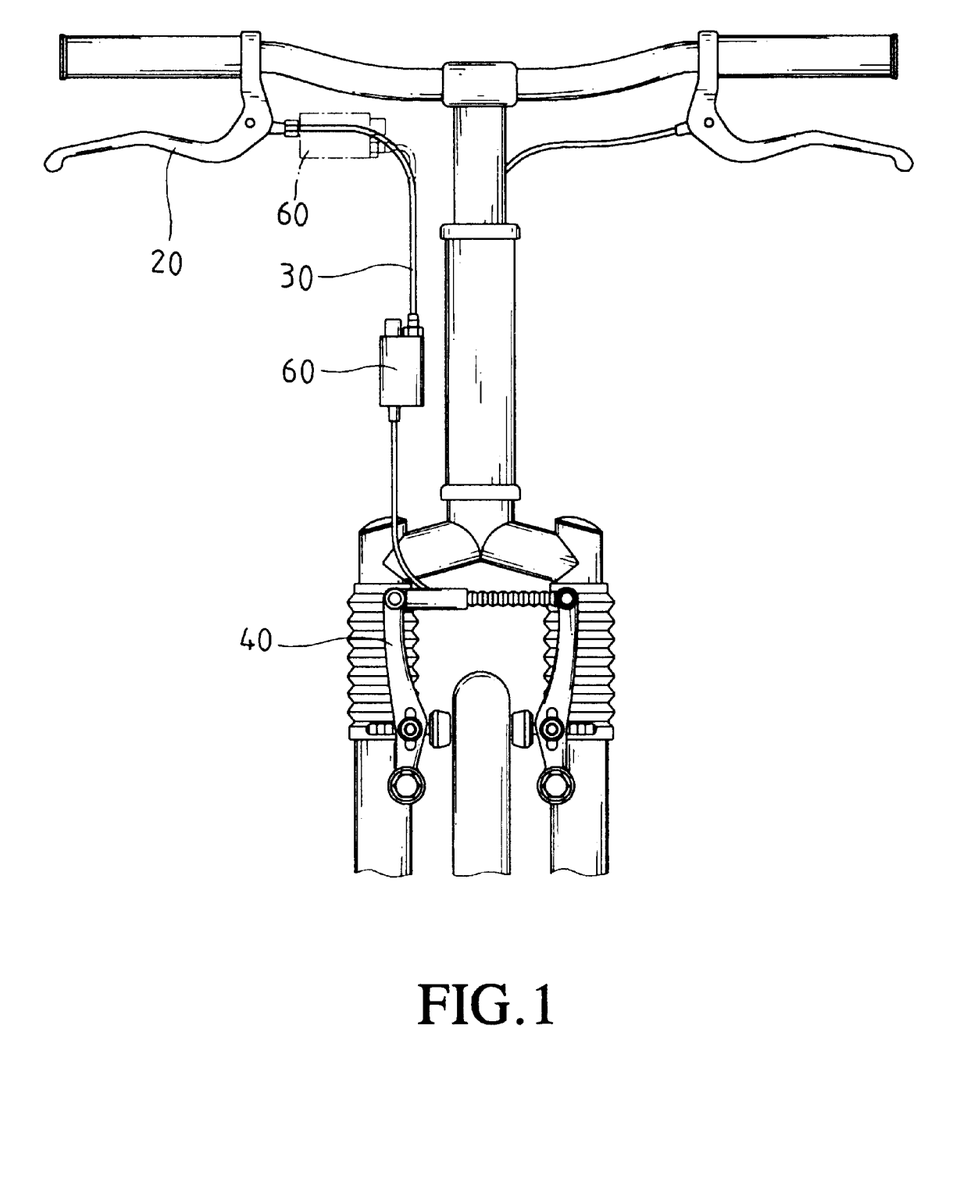
FIG. 1 is an illustrative view to show the actuator of the present invention connected near a brake lever and near the brake mechanism.
Figure 2:
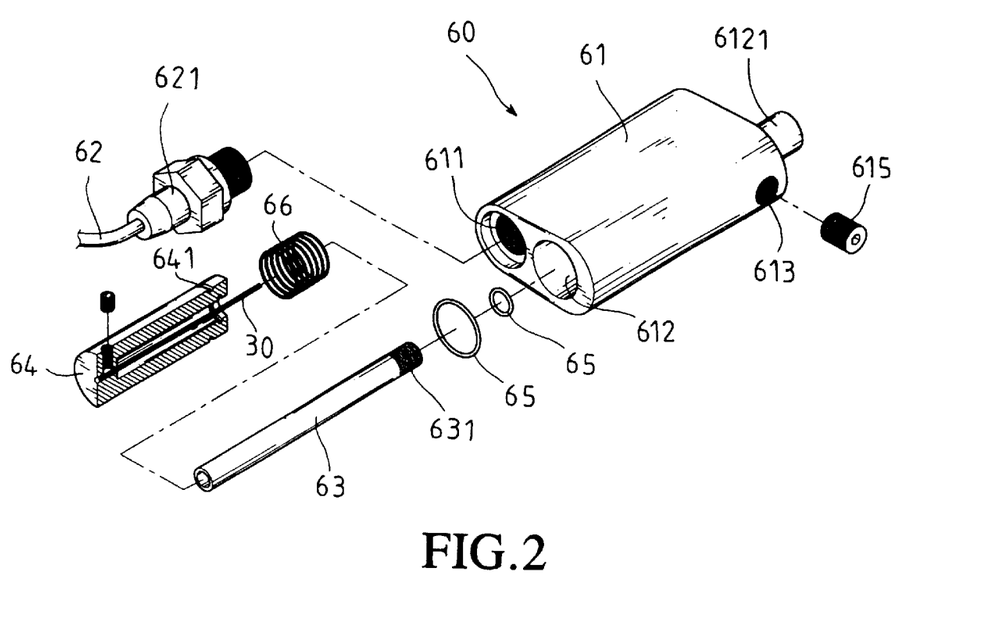
FIG. 2 is an exploded view to show the actuator of the present invention.
Figure 3:
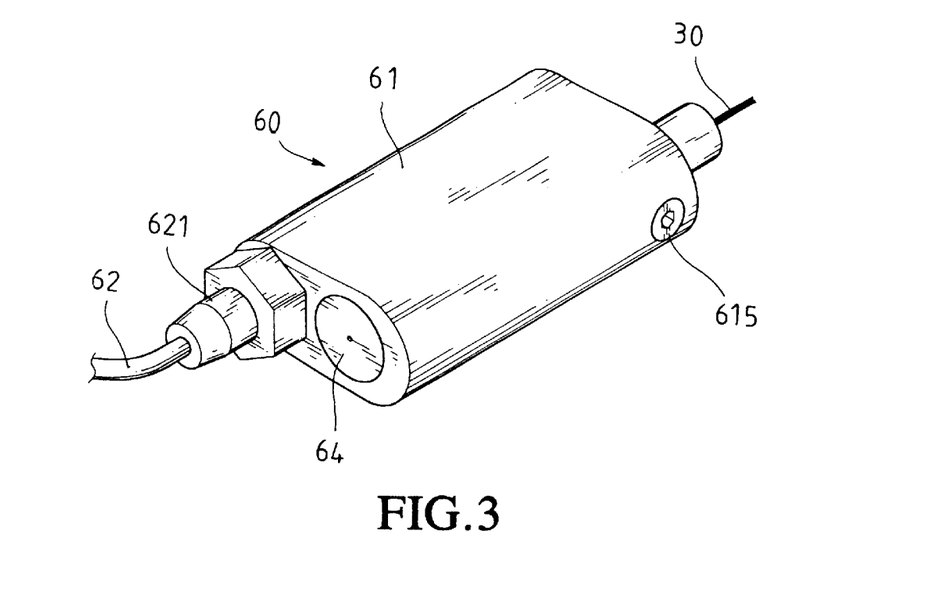
FIG. 3 is a perspective view to show the actuator of the present invention.
Figure 4A:
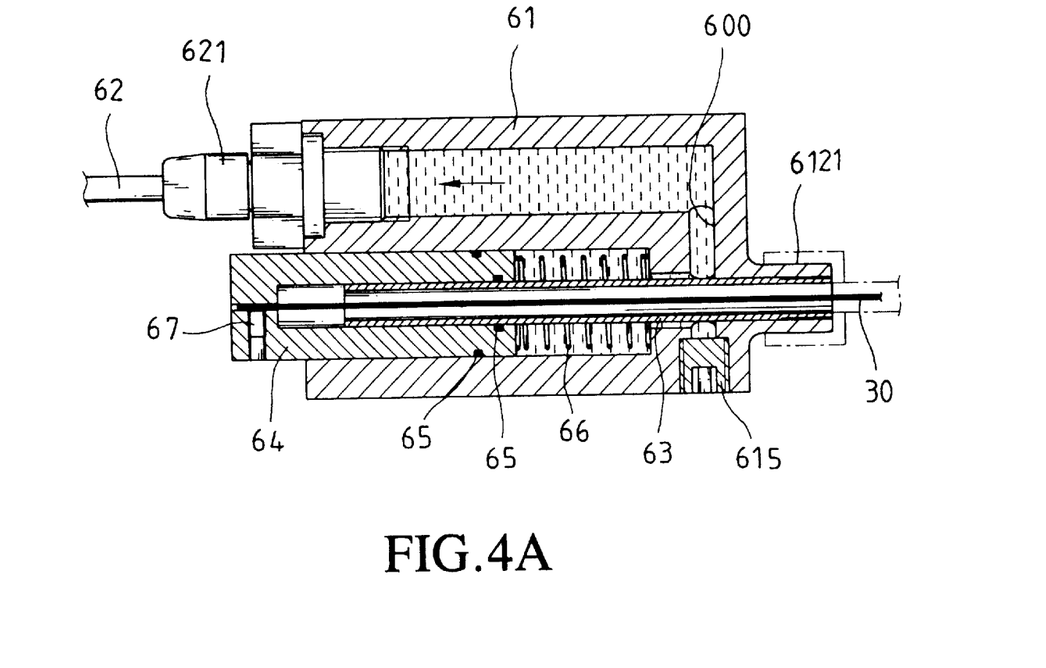
FIG. 4A is a side elevational view, partly in section, of the actuator of the present invention wherein the brake cable is not yet pulled.
Figure 5:
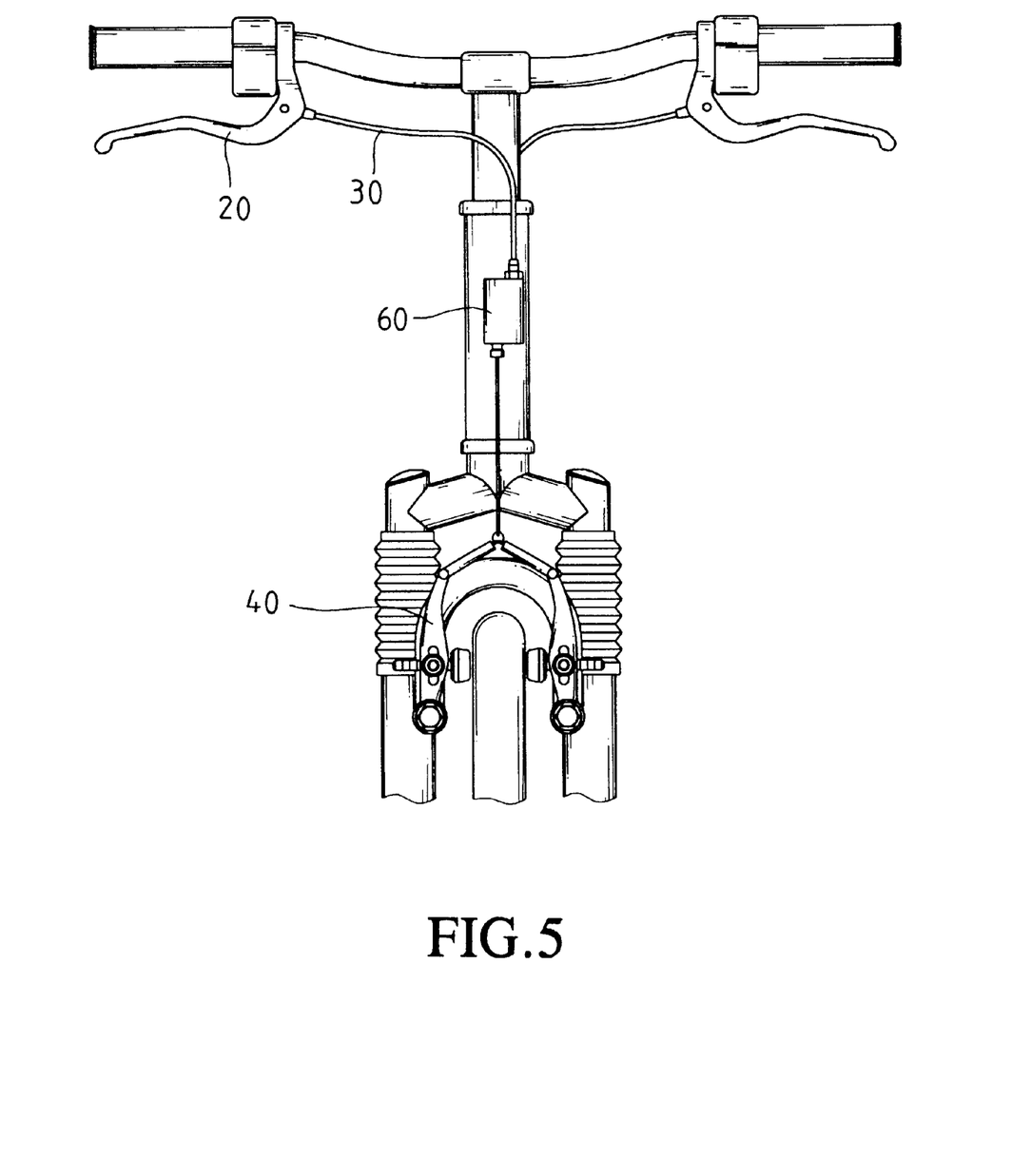
FIG. 5 is an illustrative view to show the actuator of the present invention cooperated with a Y type brake mechanism.
Figure 6:
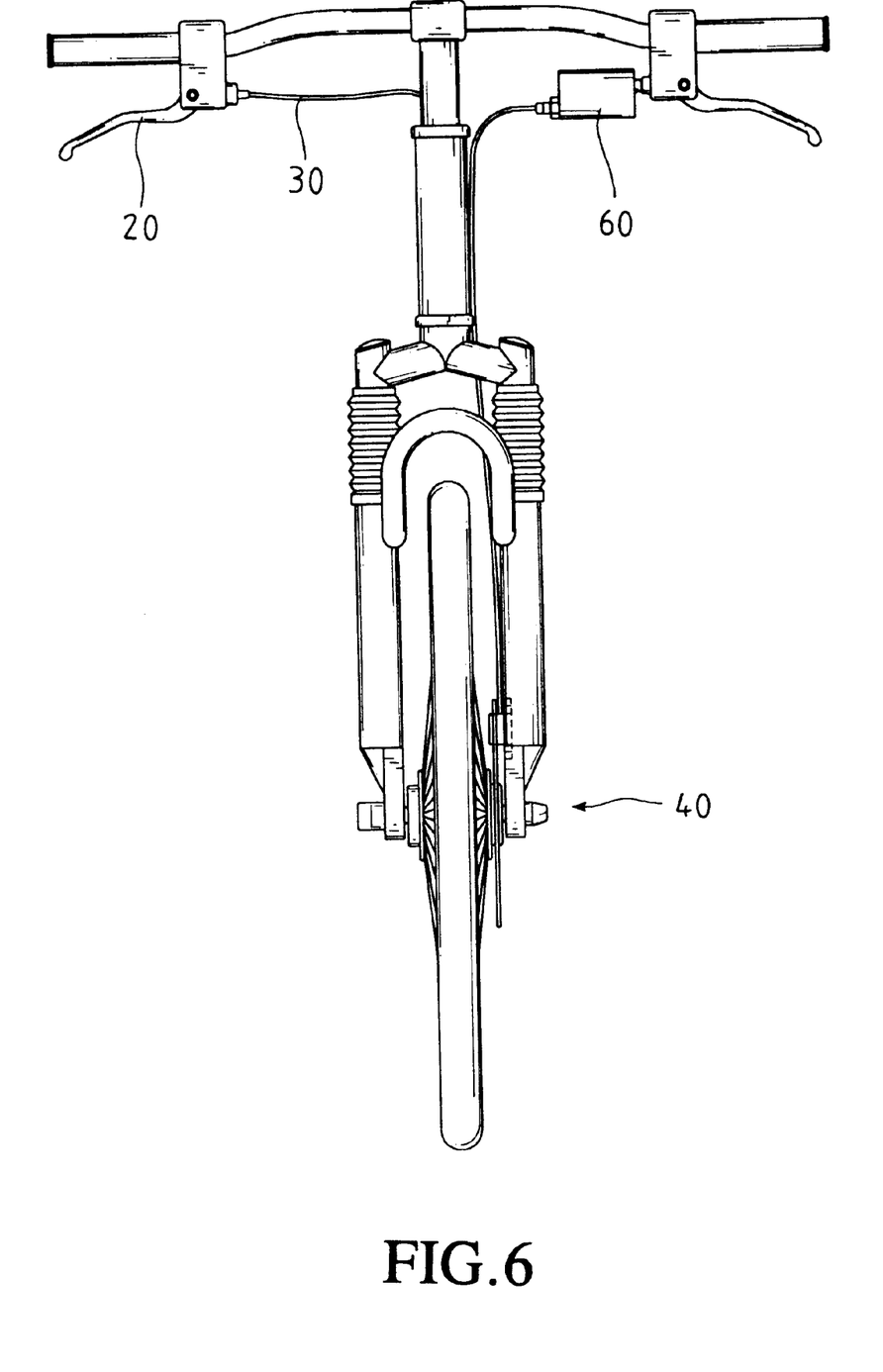
FIG. 6 is an illustrative view to show the actuator of the present invention cooperated with a disk brake mechanism.
Figure 7:
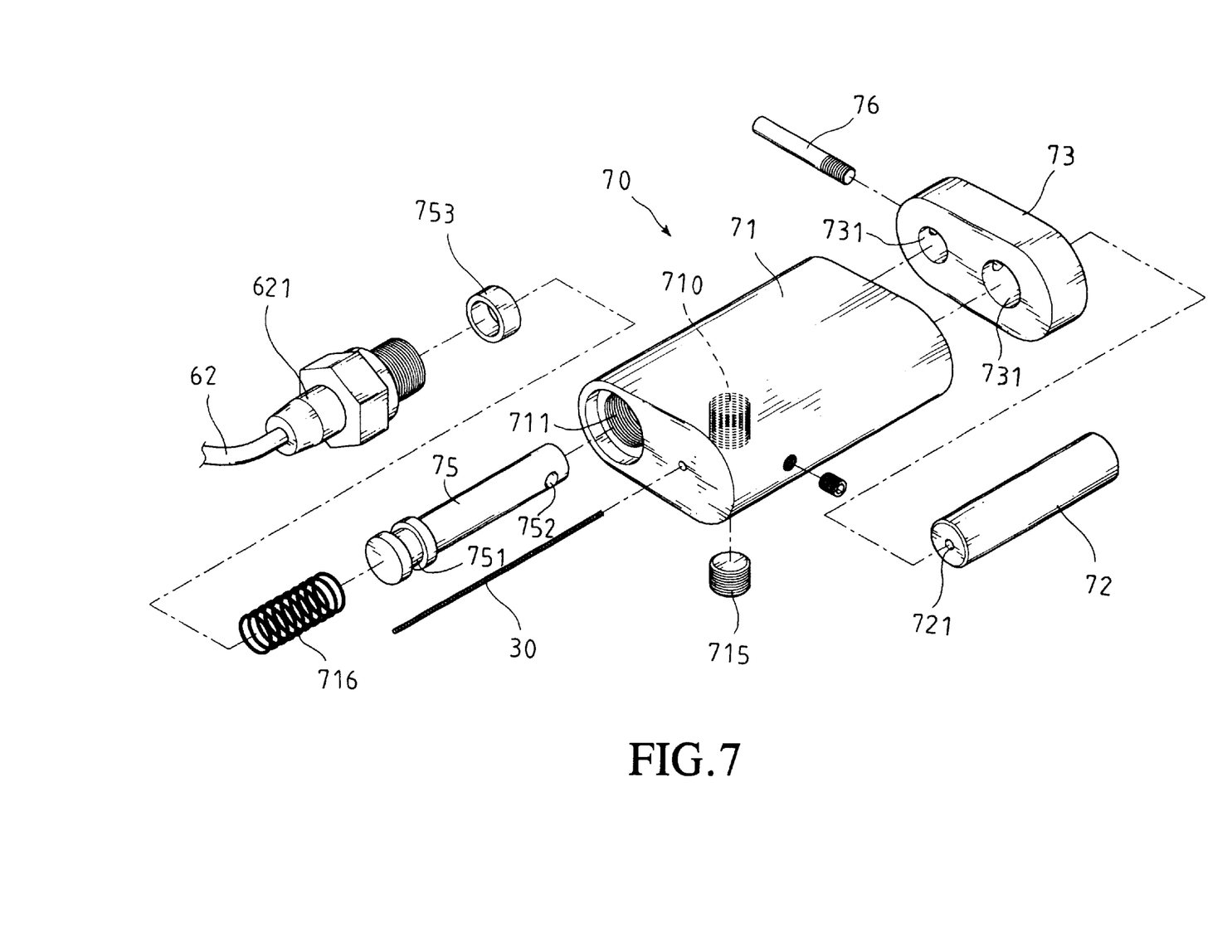
FIG. 7 is an exploded view to show another embodiment of the actuator of the present invention.
Figure 8:
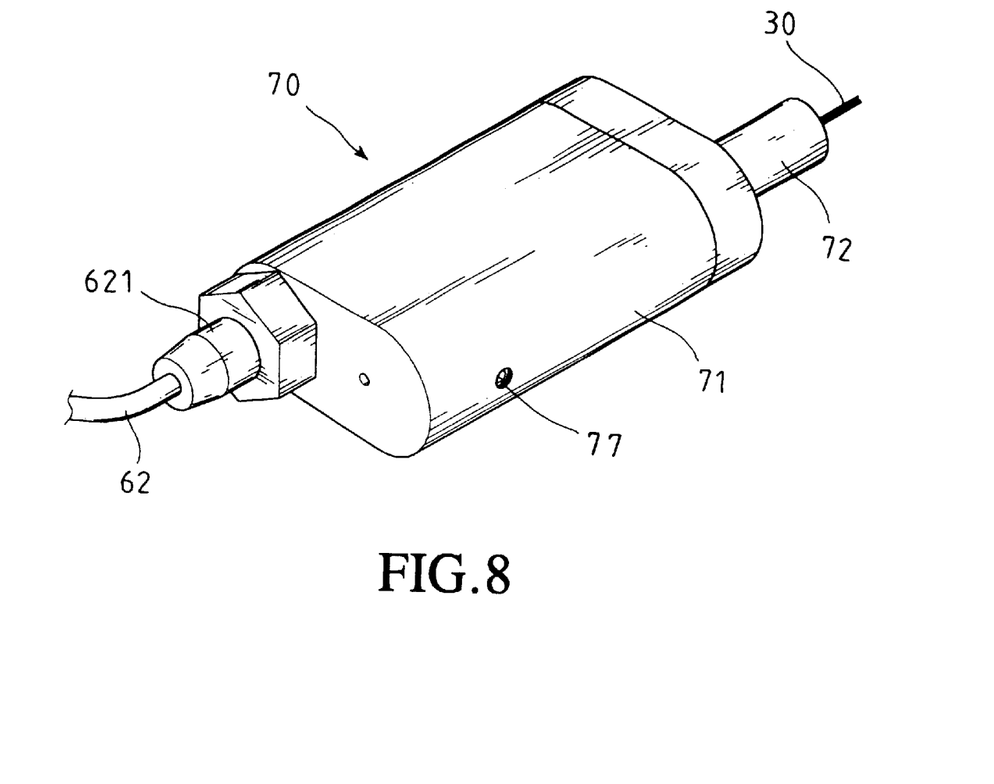
FIG. 8 is a perspective view to show the actuator of the present invention as shown in FIG. 7.
Figure 9:
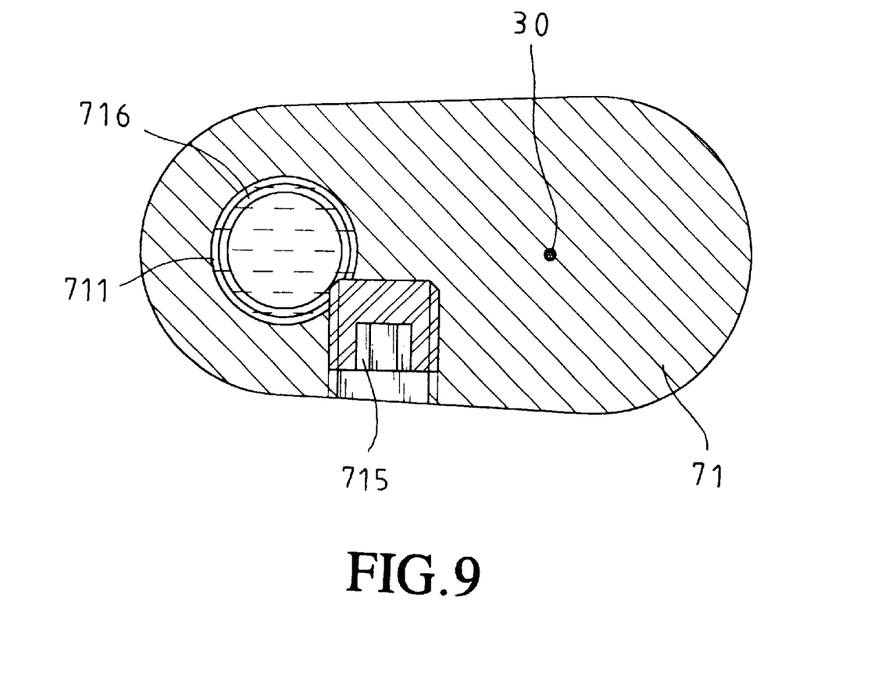
FIG. 9 is a cross-sectional view to show a position relationship between a chamber and a second hole in the box of the actuator of the present invention as shown in FIG. 7.

Referring to FIGS. 1, 5 and 6, the actuator 60 in accordance with the present invention can be connected close to a brake lever 20 or close to a brake mechanism 40 such as Y-type brake mechanism 40 in FIG. 5 or a disk brake mechanism 40 in FIG. 6. Referring to FIGS. 2, 3 and 4A, the actuator 60 includes a box 61 having a chamber 612 and a passage 611 which communicates with the a chamber 612 by a communicating path 600 between the chamber 612 and the passage 611. Hydraulic oil is filled in the chamber 612, the communicating path 600 and passage 611. A piston 64 is movably inserted into the chamber 612 and a brake cable 30 is fixedly connected to the piston 64. The piston 64 has a groove 641 defined in an outside of the piston 64 so that a seal 65 is engaged with the groove 641. A first hole is defined radially in the piston 64 and a positioning nut 67 is threadedly inserted into the first hole and contacts the brake cable 30. A connection head 6121 extends from the box 61 and a hollow rod 63 is received in the chamber 612 and an end 631 of the hollow rod 63 is fixedly connected to the connection head 6121. Another seal 65 is mounted to the hollow rod 63. A spring 66 is mounted to the hollow rod 63 and biased between an end of the piston 64 and an inside defining the chamber 612. A connection unit 621 is engaged with the passage 611 and connected to a brake mechanism 40 by a tube 62. A second hole 613 is defined radially in the piston 64 and communicates with the chamber 612. A leakage nut 615 is threadedly engaged with the second hole 613 so that hydraulic oil can be added into the chamber 612 via the second hole 613.

Figure 4B:
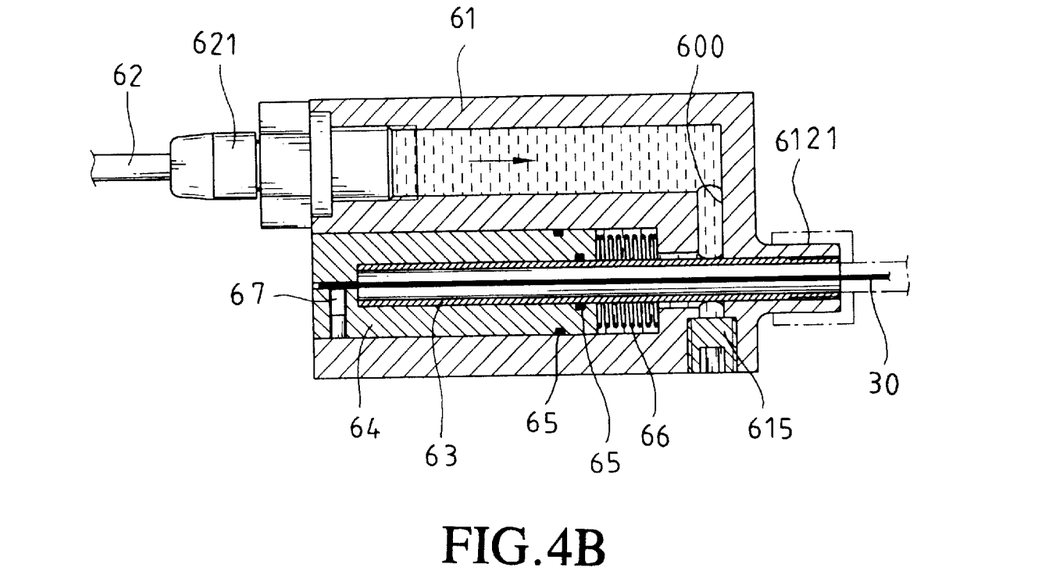
FIG. 4B is a side elevational view, partly in section, of the actuator of the present invention wherein the brake cable is pulled.

As shown in FIG. 4B, when pulling the brake lever 20, the piston 64 is moved and compresses the spring 66 so that the hydraulic oil in the chamber 612 is pushed into the passage 611 and actuates the brake mechanism 40. When the brake lever 20 is released, the piston 64 returns to its original position by the spring 66.

Referring to FIGS. 7, 8, 9 and 10A, another embodiment of the actuator 70 for a hydraulic brake system of bicycle comprises a box 71 having a passage 711 defined therethrough, a piston 75 movably inserted into the passage 711 from one end of the box 71. A connection unit 621 is engaged with the passage 711 from the other end of the box 71 so as to be connected to a brake mechanism 40 by a tube 62. A rod 72 is movably inserted into the recess 712 and a cable hole 713 is defined in the box 71 and communicates with the recess 712. A brake cable 30 extends through an aperture 721 in the rod 72 and is fixedly connected to the box 71. A first hole is defined radially in the box 71 and communicates with the cable hole 713 in which the brake cable 30 is received. A positioning nut 77 is threadedly inserted into the first hole and contacts the brake cable 30. A spring 716 is received in the passage 711 and biased between the piston 75 and the connection unit 62. A second hole 710 is defined radially in the box 71 and communicates with the passage 711 so that a leakage nut 715 is threadedly engaged with the second hole 710.

A third hole 752 is defined radially through the piston 75 and the rod 72 has a radial hole 752. A groove 751 is defined in an outside of the piston 75 so as to receive a seal 753 therein. A board 73 has two holes 731 and the piston 75 and the rod 72 are respectively engaged with the two holes 731. A pin 76 extends into the board 73, through the third hole 752 of the piston 75 and is engaged with the radial hole in the rod 72.

Figure 10A:
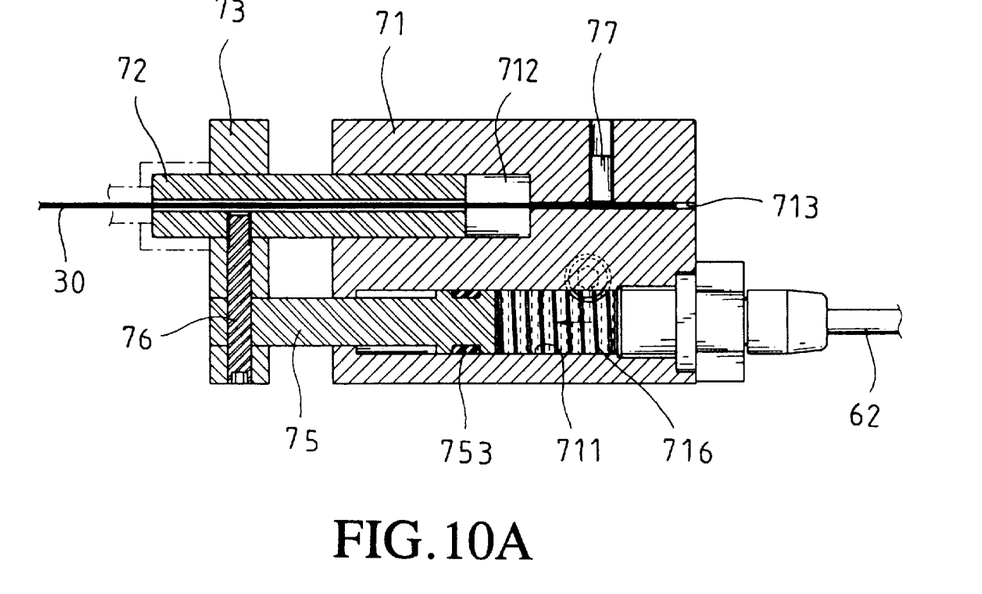
FIG. 10A is a side elevational view, partly in section, of the actuator of the present invention as shown in FIG. 7, wherein the brake cable is not yet pulled.
Figure 10B:
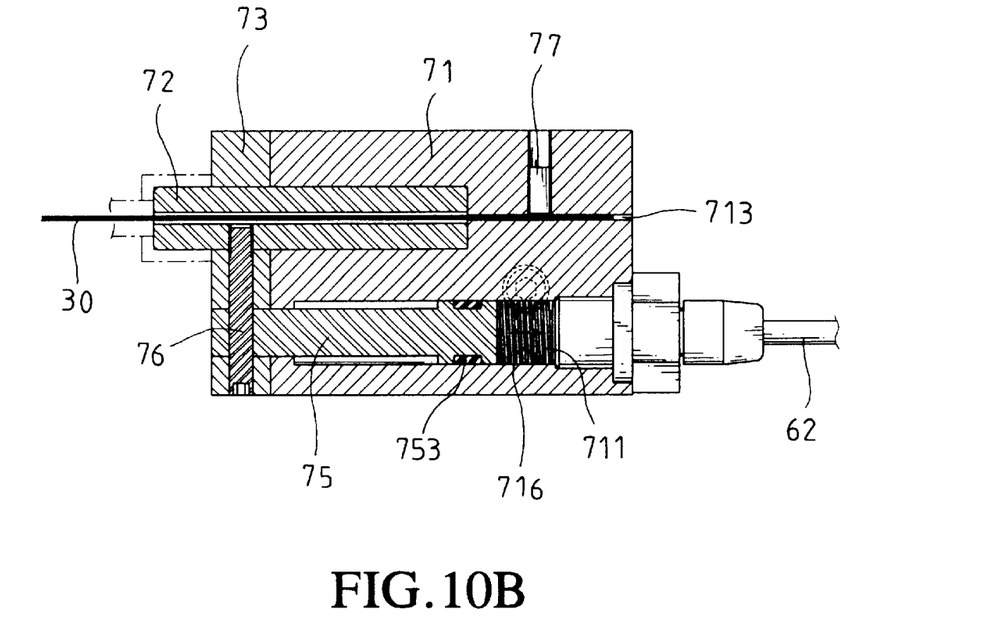
FIG. 10B is a side elevational view, partly in section, of the actuator of the present invention as shown in FIG. 7, wherein the brake cable is pulled.

Referring to FIG. 10B, when pulling the brake lever 20. The box 71 is moved toward the board 73 and the hydraulic oil in the chamber 711 is pushed to actuate the brake mechanism 40 via the tube 62.

Figure 11:
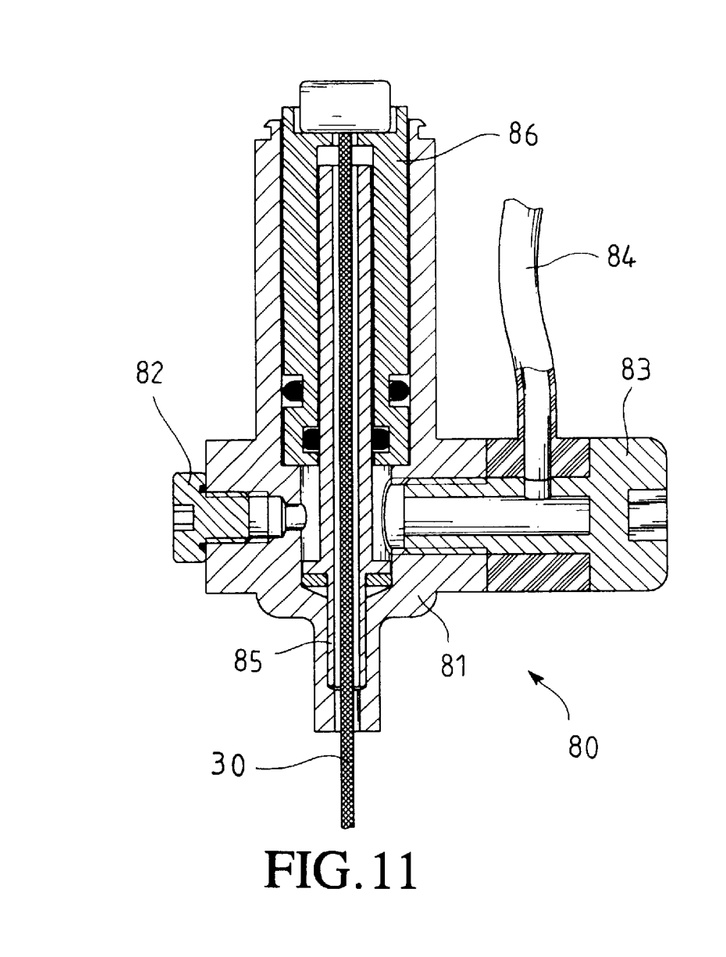
FIG. 11 is a side elevational view to show yet another embodiment of the actuator of the present invention.
Figure 12:
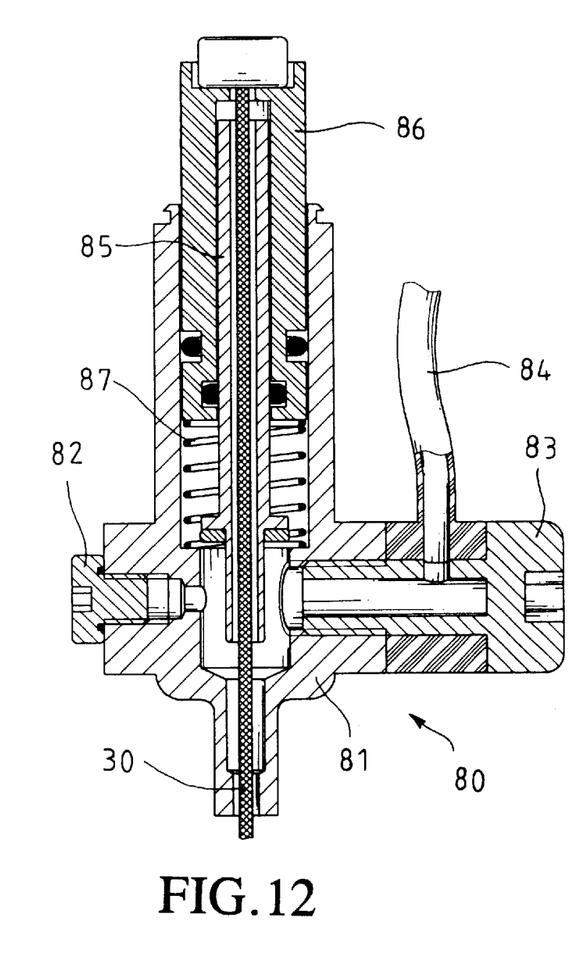
FIG. 12 is a side elevational view to show yet another embodiment of the actuator of the present invention similar to the actuator as shown in FIG. 12, wherein a spring is used to let the piston automatically move back to its original position.

Referring to FIGS. 11, the actuator 80 includes a casing 81 in which a chamber is defined and a hollow tube 85 is movably received in the chamber. A piston 86 is mounted to the hollow tube 85 and received in the chamber. A brake cable 30 extends through the hollow tube 85 and is connected to the brake mechanism 40. A leakage nut 82 and a side member 83 are respectively connected to the casing 81. Hydraulic oil can be added into the chamber via the hole in which the leakage nut 82 is engaged. A tube 84 extends from the side member 83 and is connected to the brake mechanism 40. As shown in FIG. 12, a spring 87 is biased between the piston 86 and an inside defining the chamber. Therefore, when pulling the brake lever 20, the piston 86 is moved to push hydraulic oil in the chamber into the tube 84 to actuate the brake mechanism 40.

It is to be noted that if the actuator is connected close to the brake lever 20, the spring to push the piston is required. If the actuator is connected close to the brake mechanism 40, the spring will not be necessary.

While we have shown and described various embodiments in accordance with the present invention, it should be clear to those skilled in the art that further embodiments may be made without departing from the scope and spirit of the present invention.

What is claimed is:

1. An actuator for a hydraulic brake system of a bicycle, comprising:

a box having a chamber and a passage which communicates with said chamber, a piston movably inserted into said chamber and a brake cable fixedly connected to said piston, said piston having a first hole defined radially therein said piston and a positioning nut threadedly inserted into said first hole and contacting said brake cable, said passage being adapted for connection to a brake mechanism.

2. The actuator as claimed in claim 1, wherein said box has a second hole defined radially therein, said second hole communicating with said chamber, a leakage nut being threadedly engaged with said second hole.

3. An actuator for a hydraulic brake system of a bicycle, comprising:

a box having a passage defined therethrough, a piston movably inserted into said passage from one end of said box and a connection unit engaged with said passage from an opposing end of said box, said connection unit adapted to be connected to a brake mechanism, and a recess communicating with said passage;

a rod movably inserted into said recess and a brake cable extending through said rod and fixedly connected to said box, and a board fixedly connected to said piston and said rod.

4. The actuator as claimed in claim 3, wherein a spring is received in said passage and biased between said piston and said connection unit.

5. The actuator as claimed in claim 3, wherein said box has a radial hole defined therein and a cable hole, said cable hole communicating with said recess and receiving said brake cable therethrough, said radial hole communicating with said cable hole, a positioning nut being threadedly inserted into said first hole and contacting said brake cable.

6. The actuator as claimed in claim 3, wherein said box has a radial hole defined therein and communicating with said passage, a leakage nut being threadedly engaged with said radial hole.

7. The actuator as claimed in claim 3, wherein said piston has a hole defined radially therethrough and said rod has a radial hole, a pin extending in said board extends through said hole in said piston and is engaged within said radial hole in said rod.

* * * * *